US011967762B2

(12) United States Patent
Zhang et al.

(10) Patent No.: US 11,967,762 B2
(45) Date of Patent: Apr. 23, 2024

(54) ANTENNA STRUCTURE AND ANTENNA ARRAY STRUCTURE

(71) Applicant: QuantumZ Inc., Kaohsiung (TW)

(72) Inventors: Gang-Lin Zhang, Kaohsiung (TW); Meng-Hua Tsai, Tainan (TW); Weiting Lee, Kaohsiung (TW); Sin-Siang Wang, Kaohsiung (TW)

(73) Assignee: QuantumZ Inc., Kaohsiung (TW)

(*) Notice: Subject to any disclaimer, the term of this patent is extended or adjusted under 35 U.S.C. 154(b) by 133 days.

(21) Appl. No.: 17/818,721

(22) Filed: Aug. 10, 2022

(65) Prior Publication Data

US 2023/0059332 A1 Feb. 23, 2023

(30) Foreign Application Priority Data

Aug. 19, 2021 (TW) ................................ 110130740

(51) Int. Cl.

| | |
|---|---|
| ***H01Q 21/08*** | (2006.01) |
| ***H01Q 1/38*** | (2006.01) |
| ***H01Q 15/00*** | (2006.01) |
| ***H01Q 15/14*** | (2006.01) |
| ***H01Q 21/06*** | (2006.01) |
| ***H01Q 21/20*** | (2006.01) |

(52) U.S. Cl.

CPC ............. *H01Q 15/008* (2013.01); *H01Q 1/38* (2013.01); *H01Q 15/14* (2013.01); *H01Q 21/062* (2013.01); *H01Q 21/08* (2013.01); *H01Q 21/20* (2013.01)

(58) Field of Classification Search

CPC . H01Q 15/006–0086; H01Q 15/14–22; H01Q 19/10

See application file for complete search history.

(56) References Cited

U.S. PATENT DOCUMENTS

| | | | | |
|---|---|---|---|---|
| 7,855,689 | B2 * | 12/2010 | Fukui | H01Q 21/068 343/846 |
| 7,994,984 | B2 * | 8/2011 | Inoue | H01Q 9/42 343/909 |
| 9,136,609 | B2 * | 9/2015 | Ando | H01Q 9/0407 |
| 9,450,311 | B2 * | 9/2016 | Ng | H01Q 15/24 |
| 9,780,434 | B1 * | 10/2017 | Weller | H01Q 9/065 |
| 10,965,020 | B2 * | 3/2021 | Nakamura | H01Q 1/525 |
| 11,177,556 | B2 * | 11/2021 | Jeon | H01Q 1/38 |
| 11,411,296 | B2 * | 8/2022 | Dahle | H01Q 1/38 |

(Continued)

*Primary Examiner* — Ab Salam Alkassim, Jr.

(74) *Attorney, Agent, or Firm* — CKC & Partners Co., LLC

(57) ABSTRACT

An antenna structure includes a substrate, a plurality of reflective plates, a grounding plate, a radiating member, a signal feeding via and a plurality of conductive vias. The substrate has opposite first and second surfaces and comprises liquid crystal polymer. The reflective plates are arrayed on the first surface of the substrate. The grounding plate is disposed on the second surface of the substrate and overlapped with the reflective plates in a normal direction of the substrate. The grounding plate further includes an opening. The radiating member is disposed on the first surface of the substrate and physically separated from the reflective plates. The signal feeding via is coupled with the radiating member and penetrates through the substrate to be exposed in the opening of the grounding plate. The conductive vias penetrate through the substrate and respectively connect the reflective plates and the grounding plate.

10 Claims, 18 Drawing Sheets

(56) References Cited

U.S. PATENT DOCUMENTS

| | | | | |
|---|---|---|---|---|
| 11,862,869 | B2 * | 1/2024 | Zhang | H01Q 11/14 |
| 2003/0197658 | A1 * | 10/2003 | Lilly | H01Q 15/008<br>343/909 |
| 2005/0068233 | A1 * | 3/2005 | Tanaka | H01Q 15/008<br>343/729 |
| 2013/0050015 | A1 * | 2/2013 | Black | H01Q 21/20<br>342/175 |
| 2015/0194728 | A1 * | 7/2015 | Piau | H01Q 1/286<br>343/841 |
| 2017/0214120 | A1 * | 7/2017 | Lee | H01Q 1/2291 |
| 2019/0229398 | A1 * | 7/2019 | Ryoo | H01Q 1/243 |
| 2019/0302225 | A1 * | 10/2019 | Kawaguchi | H01Q 9/0407 |
| 2019/0305432 | A1 * | 10/2019 | Kim | H01Q 1/38 |
| 2020/0021015 | A1 * | 1/2020 | Yun | H01Q 1/2283 |
| 2020/0412017 | A1 * | 12/2020 | Park | H01Q 21/24 |
| 2020/0412022 | A1 * | 12/2020 | Yun | H01Q 21/22 |
| 2023/0054657 | A1 * | 2/2023 | Zhang | H01Q 15/008 |
| 2023/0216181 | A1 * | 7/2023 | Saleh | H01Q 15/0086<br>343/718 |
| 2023/0231317 | A1 * | 7/2023 | Miki | H01Q 21/08<br>343/702 |
| 2023/0352824 | A1 * | 11/2023 | Yamakawa | H01Q 21/08 |

* cited by examiner

ANTENNA STRUCTURE AND ANTENNA ARRAY STRUCTURE

RELATED APPLICATIONS

This application claims priority to Taiwan Application Serial Number 110130740, filed Aug. 19, 2021, which is herein incorporated by reference.

BACKGROUND

Field of the Invention

This disclosure relates to an antenna structure, and more particularly to an antenna with reflective plates and an antenna array structure.

Description of Related Art

With the vigorous development of communication technologies, the commercial mobile communication systems are able to achieve high-speed data transmissions, and enable network service providers to provide various services such as multimedia video streaming, real-time traffic report, driving navigation, audio and video over IP (AVoIP) communication and other network services that require huge amounts of data transmission. In terms of hardware, the antenna design affects the performance of wireless signals transmission and reception. Therefore, how to design an antenna structure that has a wide frequency band as well as good radiation efficiency and antenna gain has become one of the goals for the industries.

SUMMARY

One aspect of the disclosure directs to an antenna structure which includes a substrate, reflective plates, a grounding plate, a first radiating member, a signal feeding via and first conductive vias. The substrate has opposite first and second surfaces and includes liquid crystal polymer material. The reflective plates are disposed on the first surface of the substrate and are arranged in an array. The grounding plate is disposed on the second surface of the substrate and is overlapped with the reflective plates in a normal direction of the substrate. The grounding plate has an opening. The first radiating member is disposed on the first surface of the substrate, and is physically separated from the reflective plates. The signal feeding via is coupled to the first radiating member and penetrates through the substrate to be exposed in the opening. The first conductive vias are respectively coupled to the reflective plates, and penetrate through the substrate to couple with the grounding plate. The substrate has a planar portion, a first bending portion and a first protrusive portion. The reflective plates are in the planar portion. The first radiating member extends from the planar portion to the first protrusive portion through the first bending portion.

In one embodiment, a radiating portion of the first radiating member is arranged in the first protrusive portion.

In one embodiment, an angle between the first protrusive portion and the planar portion is about 90-135 degrees.

In one embodiment, the signal feeding via is positioned between four of the reflective plates that are arranged in two columns and two rows.

In one embodiment, the antenna structure further includes a second conductive via that is coupled to the grounding branch of the first radiating member and penetrates through the substrate to couple with the grounding plate.

In one embodiment, a radiating branch of the first radiating member is a straight strip, a rectangular plate, a rectangular frame or a U-shaped frame.

In one embodiment, the antenna structure further includes a second radiating member that is disposed on the second surface of the substrate and is coupled to the grounding plate. The second radiating member and the first radiating member constitute a dipole antenna.

In one embodiment, each reflective plate is a rectangular plate, a rectangular frame, or cross-shaped.

In one embodiment, the substrate further has a second bending portion and a second protrusive portion. The grounding plate extends to the second protrusive portion through the second bending portion.

Another aspect of the disclosure directs to an antenna array structure which includes a substrate, reflective plates, a grounding plate, radiating members, signal feeding vies and conductive vias. The substrate has opposite first and second surfaces and includes liquid crystal polymer material. The reflective plates are disposed on the first surface of the substrate and are arranged in an array. The grounding plate is disposed on the second surface of the substrate and is overlapped with the reflective plates in a normal direction of the substrate. The grounding plate has openings. The radiating members are disposed on the first surface of the substrate and are physically separated from the reflective plates. The radiating members are periodically arranged in a longitudinal direction of the substrate. The signal feeding vias are respectively coupled to the radiating members and penetrate through the substrate to be exposed respectively in the openings of the grounding plate. The conductive vias are respectively coupled to the reflective plates and penetrate through the substrate to couple with the grounding plate. The substrate has a planar portion, a bending portion and a protrusive portion. The reflective plates are in the planar portion. The radiating members extend from the planar portion to the first protrusive portion through the bending portion.

BRIEF DESCRIPTION OF THE DRAWINGS

The foregoing aspects and many of the accompanying advantages of this disclosure will become more readily appreciated as the same becomes better understood by reference to the following detailed description, when taken in conjunction with the accompanying drawings.

DETAILED DESCRIPTION

The disclosure is described and explained in detail in the following. The described preferred embodiments are presented for purposes of illustrations and description, and they are not intended to limit the scope of the disclosure.

Terms used herein are only used to describe the specific embodiments, which are not used to limit the claims appended herewith. Unless limited otherwise, the term “a,” “an,” “one” or “the” of the single form may also represent the plural form.

In the following description and claims, the term “coupled” along with their derivatives, may be used. In particular embodiments, “coupled” may be used to indicate that two or more elements are in direct physical or electrical contact with each other, or may also mean that two or more elements may not be in direct contact with each other.

It should be understood that, although the terms “first,” “second,” “third” . . . etc., may be used herein to describe various elements, components and/or signals, these elements, components and/or signals, should not be limited by these terms. These terms are only used to distinguish elements, components and/or signals.

The spatially relative terms are intended to encompass different orientations of the device in use or operation in addition to the orientation depicted in the figures. The device may be otherwise oriented (rotated 90 degrees or at other orientations) and the spatially relative descriptors used herein may likewise be interpreted accordingly.

In this disclosure, the substrate has opposite first surface and second surface. The reflective plates are arrayed on the first surface of the substrate, and the grounding plate is disposed on the second surface of the substrate, thereby forming a metamaterial structure. This structure has a negative refractive index and exhibits left-handed characteristics that are different from the right-handed characteristics. Therefore, the metamaterial structure in combination with the radiating member having right-handed characteristics enable the overall antenna structure to exhibit composite left and right characteristics and the operating bandwidth is thereby increased. In addition, the parasitic capacitor generated between two adjacent reflective plates and inductive characteristics of the reflective plates form a parallel LC circuit, together with the infinite impedance of arrayed reflective plates at a resonance frequency, reflect the electromagnetic waves back to the radiating member and result in an effect similar to a notch filter. The overall radiation pattern is altered to improve antenna gain and directivity. On the other hand, the substrate is bent to make the radiating member bent by about 90-135 degrees, such bending can further reduce the parasitic capacitance between the radiating member and the grounding plate and increase the radiation efficiency and antenna gain for confined space designs.

Figure 1A:
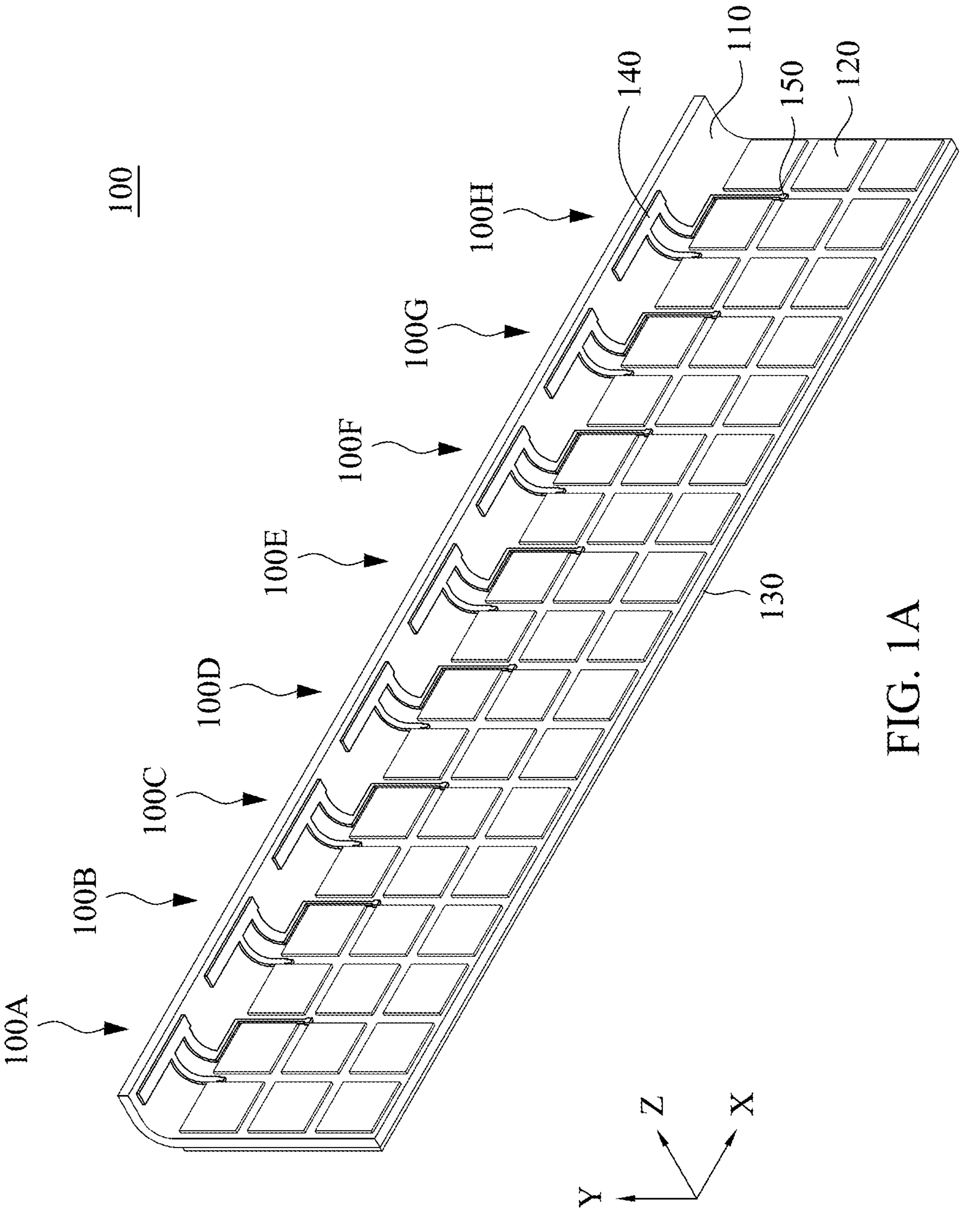
FIG. 1A is an illustration of an antenna array structure according to one embodiment of the disclosure.

FIG. 1A is an illustration of an antenna array structure 100 according to one embodiment of the disclosure. The antenna array structure 100 includes a substrate 110, reflective plates 120, a grounding plate 130 and radiating members 140. The reflective plates 120 and the radiating members 140 are disposed on a first surface of the substrate 110, and the grounding plate 130 is disposed on a second surface of the substrate 110. The antenna array structure 100 is formed by a number of antenna units 100A-100H that are arranged in an array along the longitudinal direction (X-axis) of the substrate 110. Each of the antenna units 100A-100H corresponds to one of the radiating members 140. The antenna array structure 100 may be configured for multiple-input multiple-output (MIMO), single-input single-output (SISO), multiple-input single-output (MISO) and/or single-input multiple-output (SIMO) wireless transmissions.

Figure 1B:
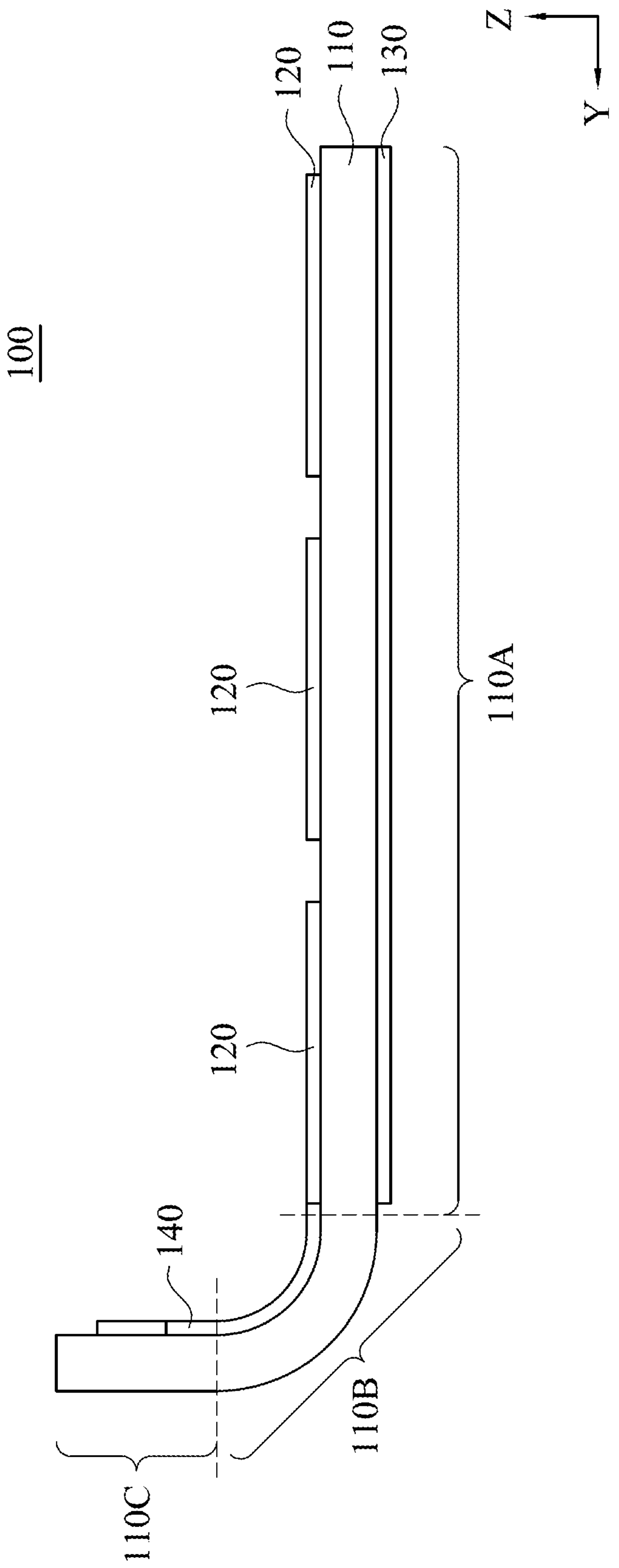
FIG. 1B is a side view of the antenna array structure in FIG. 1A.

The substrate 110 is a bendable flexible substrate which comprises liquid crystal polymer material. In addition, as shown in FIG. 1B, the top-view of the antenna array structure 100, the substrate 110 has a planar portion 110A, a bending portion 110B and a protrusive portion 110C, where the bending portion 110B is between the planar portion 110A and the protrusive portion 110C. The planar portion 110A and the protrusive portion 110C are respectively in the Y-axis and Z-axis directions. The X-axis, Y-axis and Z-axis directions may be perpendicular or approximate perpendicular to each other in this embodiment. The angles may be modified to accommodate different design requirements in other embodiments. For example, the angle between the planar portion 110A and the protrusive portion 110C may be about 90-135 degrees after bending of the substrate 110.

The reflective plates 120 and the grounding plate 130 are in the planar portion 110A of the substrate 110 and overlapped in the normal direction of the substrate 110. The reflective plates 120 are square patches and are arranged in an array of multiple rows and columns on the first surface of the substrate 110 in this embodiment. The reflective plates 120 may have other geometric shapes and arrangements in other embodiments. The grounding plate 130 is a rectangular patch, and the size thereof may be approximately the same as that of the planar portion 110A. Each reflective plate 120 may be electrically connected to the grounding plate 130 by a conductive via (not shown in FIGS. 1A and 1B) that penetrates through the substrate 110. The material of the reflective plates 120 and the grounding plate 130 may be, for example, a metal of copper, silver, gold, platinum, nickel, tin, an alloy thereof, and/or another suitable material.

Each radiating member 140 is bendable and extends from the planar portion 110A of the substrate 110 to the protrusive portion 110C through the bending portion 1108. Several radiating members 140 are periodically arranged along the longitudinal direction of the substrate 110. The material of the radiating member 140 may be, for example, a metal of copper, silver, gold, platinum, nickel, tin, an alloy thereof, and/or another suitable material.

Figure 1C:
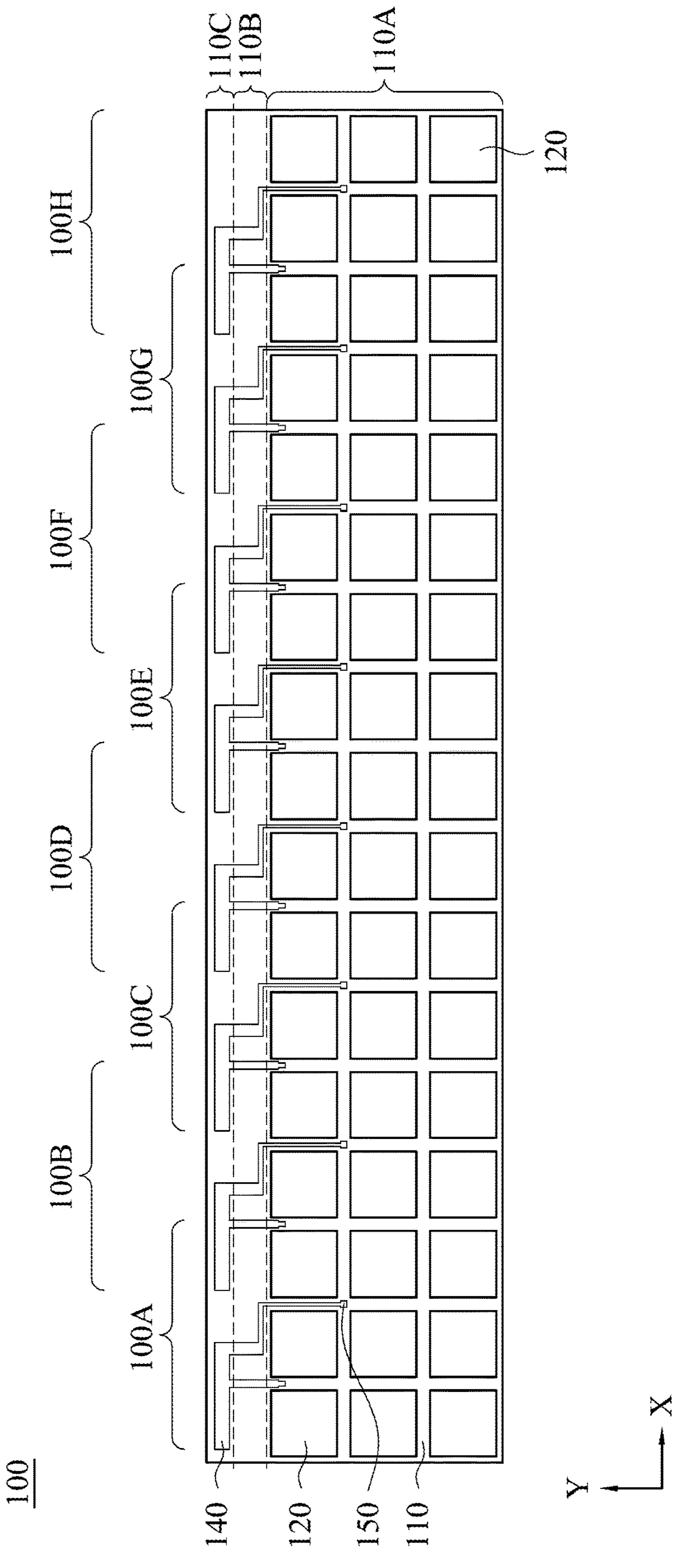
FIGS. 1C and 1D are planar views respectively from the first and second surfaces of the antenna array structure in FIG. 1A where the substrate is not bent.
Figure 1D:
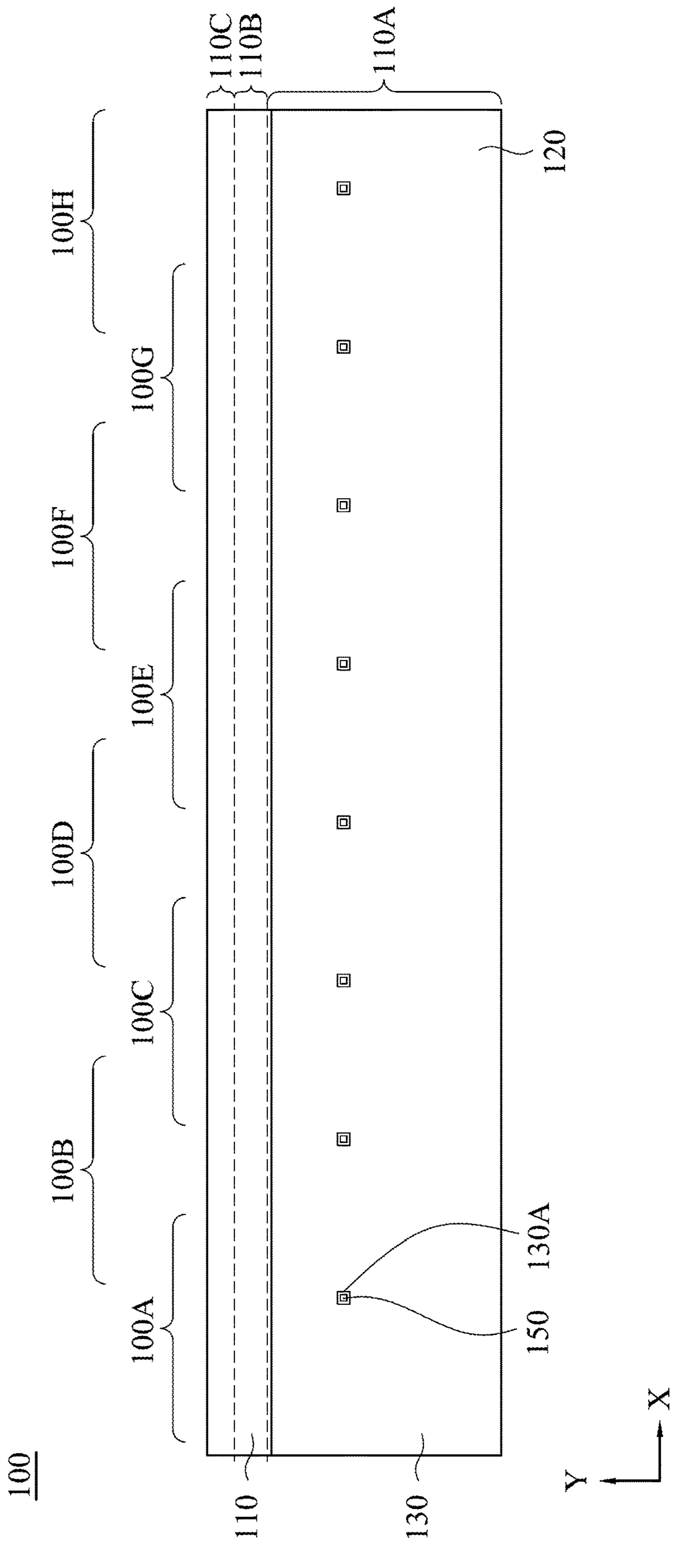

FIGS. 1C and 1D are planar views of the first and second surfaces of the antenna array structure 100 respectively without the substrate 110 being bent. In the embodiment, as shown in FIGS. 1C and 1D, each of the antenna units 100A-100H includes 3×3 reflective plates 120, a radiating member 140 and a signal feeding via 150 that connects to an end of the radiating member 140. The signal feeding vias 150 are through holes that penetrate through the substrate 110, and the grounding plate 130 has openings 130A corresponding to the signal feeding vias 150, such that the ends of the signal feeding vias 150 on the second surface of the substrate 110 are exposed respectively in the opening 130A for connecting external terminals. The antenna units 100A-100H have a similar structure, and the reflective plates 120, the radiating members 140 and the signal feeding vias 150 are periodically arranged in the longitudinal direction of the substrate 110.

Figure 1E:
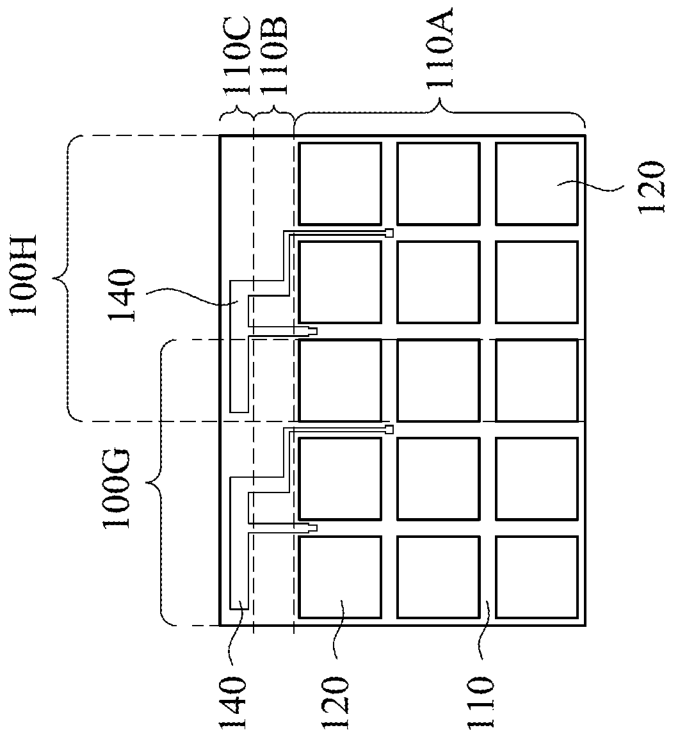
FIG. 1E is a partial planar view from the first surface of the antenna array structure in FIG. 1A.

It should be noted that adjacent antenna units 100A-100H may share the reflective plates 120. As shown in FIG. 1E, the rightmost three reflective plates 120 of the antenna unit 100G are also used as the leftmost three reflective plates 120 of the antenna unit 100H. It should be noted that the radiating member 140 of the antenna unit 100H does not belong to the antenna unit 100G although a part of the radiating member 140 of the antenna unit 100H extends into the area of the antenna unit 100G.

In this embodiment, the protrusive portion 110C is defined by bending the substrate 110. However, the substrate 110 may be modified to have only the planar portion 110A and the protrusive portion 110C without bending in other embodiments. The protrusive portion 110C may also be formed by stacking or adhering to the same or different material on an edge of the planar portion 110A. The inner surface of the protrusive portion 110C may further have reflective plates and radiating members, so as to further improve the gain performance of the antenna array structure 100.

Figure 2B:
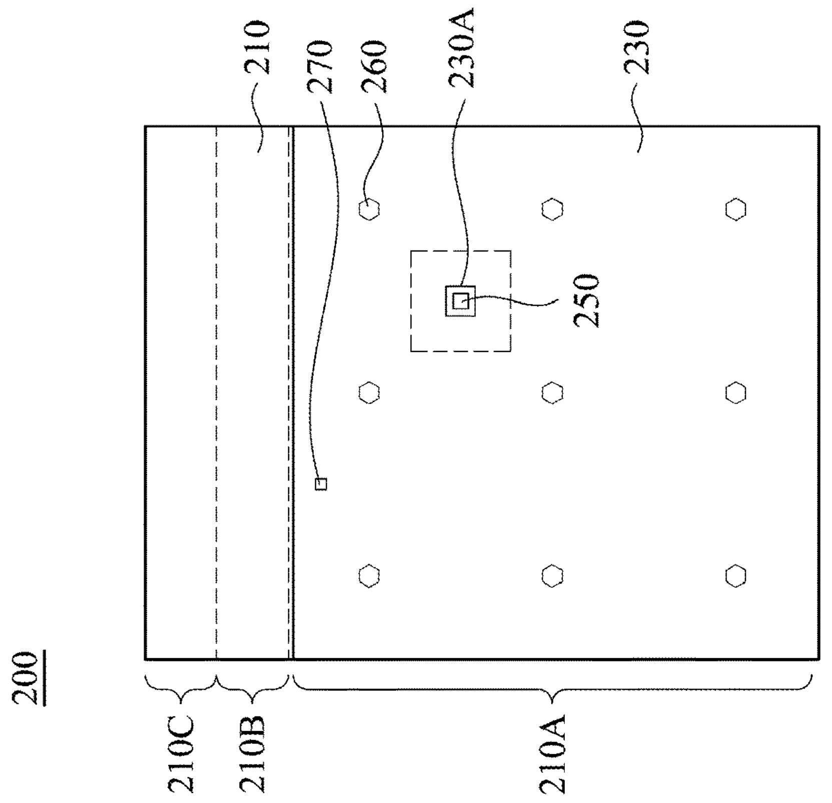
FIGS. 2A and 2B are planar views respectively from the first and second surfaces of an antenna structure according to one embodiment of the disclosure.
Figure 2A:
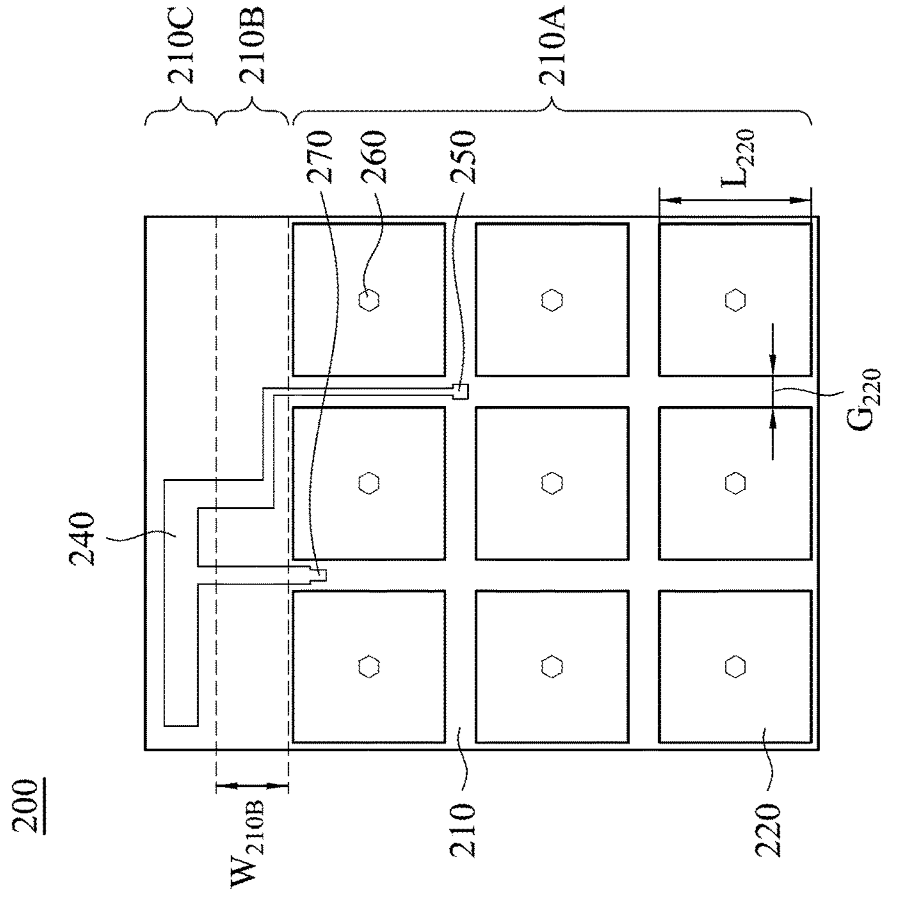

FIGS. 2A and 2B are planar views respectively from the first and second surfaces of an antenna structure 200 according to one embodiment of the disclosure. The antenna structure 200 may be the structure of each of the antenna units 100A-100H of the antenna array structure 100 in FIG. 1A. As shown in FIGS. 2A and 2B, the antenna structure 200 includes a substrate 210, reflective plates 220, a grounding plate 230, a radiating member 240, a signal feeding via 250, first conductive vias 260 and a second conductive via 270. The substrate 210 has a planar portion 210A, a bending portion 210B and a protrusive portion 210C. The reflective plates 220 are at the first surface of the substrate 210 and in the planar portion 210A. The grounding plate 230 is at the second surface of the substrate 210 and in the planar portion 210A. The radiating member 240 is at the first surface of the substrate 210 and extends from the planar portion 210A to the protrusive portion 210C through the bending portion 210B. The signal feeding via 250, the first conductive vias 260 and the second conductive via 270 are through via structures penetrating through the substrate 210 and in the planar portion 210A. The substrate 210, the reflective plates 220, the grounding plate 230, the radiating member 240 and the signal feeding via 250 may respectively correspond to the substrate 110, the reflective plates 120, the grounding plate 130, the radiating member 140 and the signal feeding via 150 of any one of the antenna units 100A-100H of the substrate 110 in FIGS. 1A-1D.

The radiating member 240 shown in FIG. 2A is an inverted-F antenna, which is physically separated from the reflective plates 220 and has a radiating branch, a signal feeding branch and a grounding branch. The radiating branch is in the protrusive portion 210C, one end of the signal feeding branch and one end of the grounding branch are coupled to the radiating branch, the other end of the signal feeding branch is coupled to the signal feeding via 250, and the other end of the grounding branch is coupled to the second conductive via 270. As shown in FIG. 2A, the signal feeding branch of the radiating member 240 has a continuous bending shape, and the grounding branch of the radiating member 240 is a straight strip. The signal feeding via 250 penetrates through the substrate 210 and exposes in an opening 230A defined by the grounding plate 230 at the second surface of the substrate 210, and the second conductive via 270 penetrates through the substrate 210 to electrically connect the grounding plate 230. In addition, each first conductive via 260 penetrates through the substrate 210 to electrically connect the grounding plate 230 and one of the reflective plates 220. Similar to the reflective plates 220, the first conductive vias 260 are also arranged in an array of three columns and three rows.

As shown in FIG. 2B, in the normal direction of the substrate 210, the signal feeding via 250 is between the reflective plates 220 which respectively at the upper right surface, the middle right surface, the upper middle surface and the center, the first conductive vias 260 are respectively at the centers of the reflective plates 220, and the second conductive via 270 is between the reflective plates 220 respectively at the upper left surface and the upper center surface. However, the positions of the signal feeding via 250, the first conductive vias 260 and the second conductive via 270 may be modified depending on the number and size of the reflective plates 220 and/or the size and pattern of the radiating member 240 and are not limited to the positions shown in FIGS. 2A and 2B.

Figure 2D:
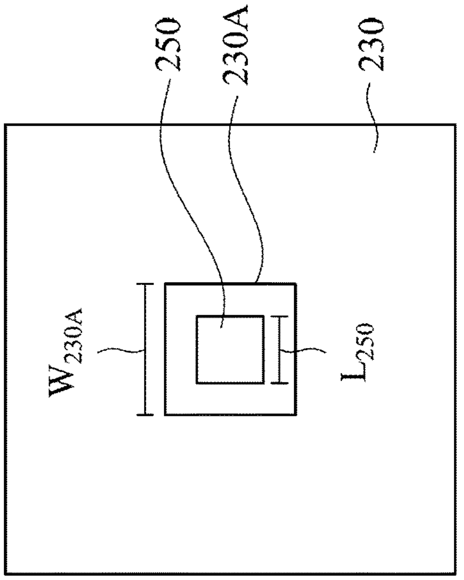
FIG. 2D is partial planar view from the second surface of the antenna structure of FIGS. 2A and 2B.
Figure 2C:
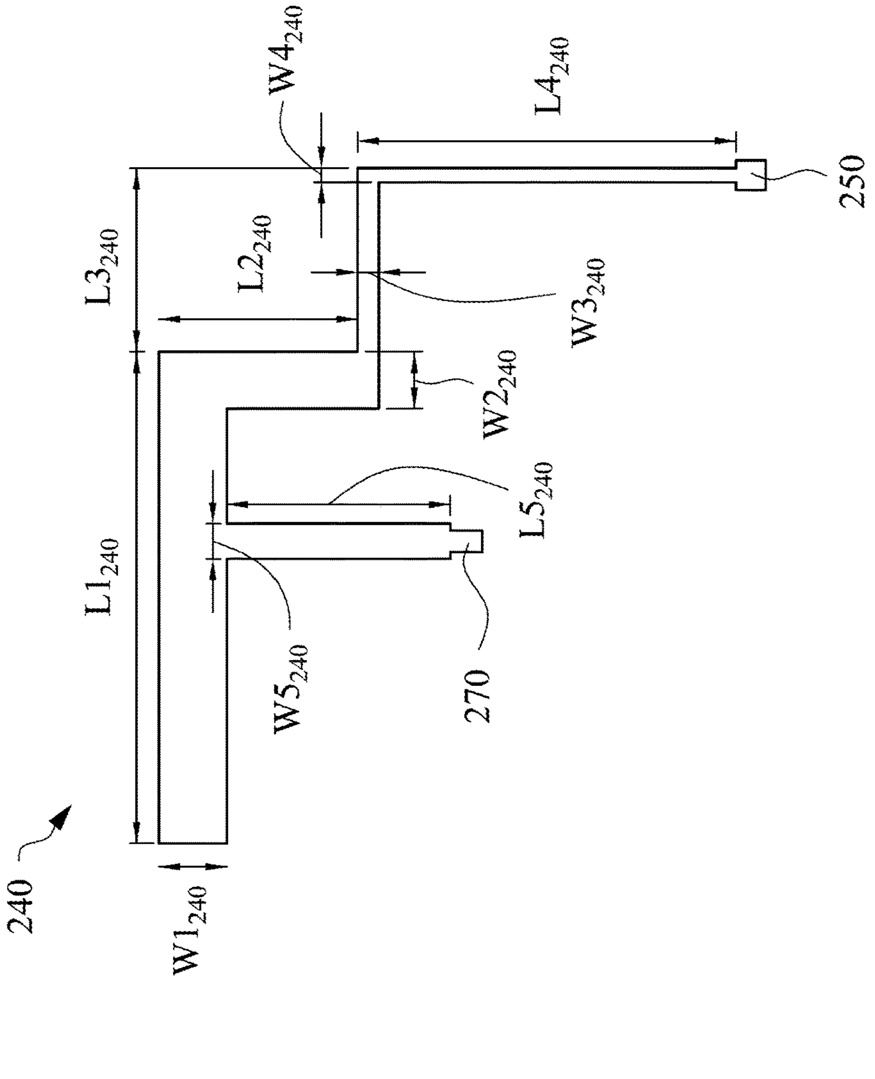
FIG. 2C is an enlarged planar view of the radiating member of FIG. 2A.

FIG. 2C is an enlarged planar view of the radiating member 240 shown in FIG. 2A. As shown in FIG. 2C, the radiating member branch has only one straight section with a length $L1_{240}$ and a width $W1_{240}$. The signal feeding branch has three straight sections respectively with lengths $L2_{240}$, $L3_{240}$, $L4_{240}$ and widths $W2_{240}$, $W3_{240}$, $W4_{240}$. The grounding branch has only one straight section with a length $L5_{240}$ and a width $W5_{240}$. In addition, FIG. 2D is partial planar view from the second surface of the antenna structure 200. As shown in FIG. 2D, the grounding plate 230 defines the square opening 230A with a width $W_{230A}$, and the signal feeding via 250 is in the square opening 230A and has a square planar pattern with a length $L_{250}$.

Figure 3A:
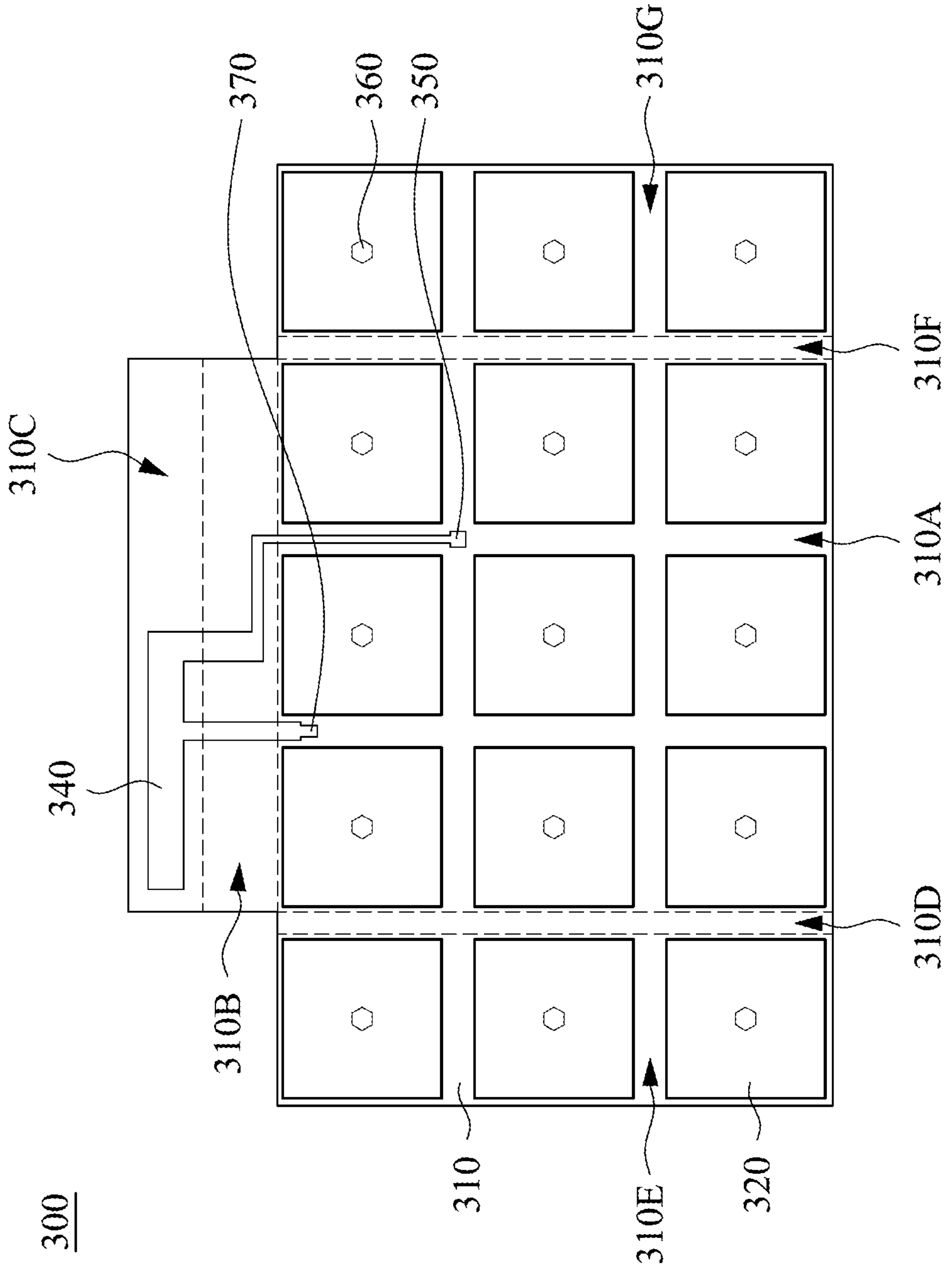
FIGS. 3A and 3B are planar views respectively from the first and second surfaces of an antenna structure according to one embodiment of the disclosure.
Figure 3B:
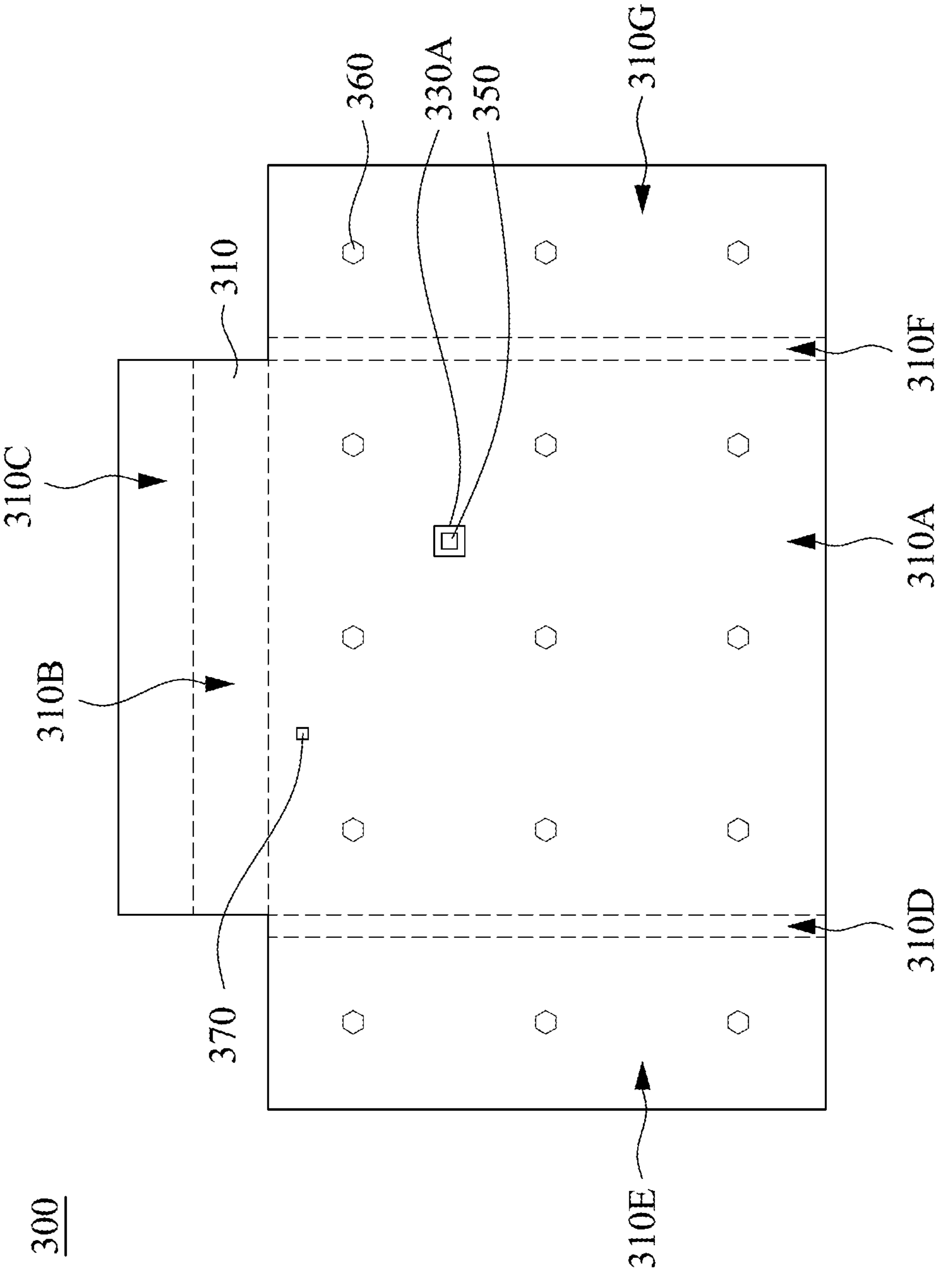

FIGS. 3A and 3B are planar views respectively from the first and second surfaces of an antenna structure 300 according to one embodiment of the disclosure. As shown in FIGS. 3A and 3B, the antenna structure 300 includes a substrate 310, reflective plates 320, a grounding plate 330, a radiating member 340, a signal feeding via 350, first conductive vias 360 and a second conductive via 370. The reflective plates 320 and the radiating member 340 are disposed on the first surface of the substrate 310, and the grounding plate 330 is disposed on the second surface of the substrate 310. The signal feeding via 350 penetrates through the substrate 310 to be exposed in an opening 330A defined by the grounding plate 330.

The difference between the antenna structure 300 in FIGS. 3A and 3B and the antenna structure 200 in FIGS. 2A and 2B is additional bending sections 310E and 310G. The antenna structure 300 has a planar portion 310A, a first bending portion 310B and a first protrusive portion 310C that are respectively similar to the planar portion 210A, the bending portion 210B and the protrusive portion 210C of the antenna structure 200. The substrate 310 also has a second bending portion 310D and a second protrusive portion 310E extending toward left and a third bending portion 310F and a third protrusive portion 310G. As shown in FIGS. 3A and 3B, the second protrusive portion 310E and the third protrusive portion 310G also have reflective plates 320, and the grounding plate 330 also extends from the planar portion 310A to the second protrusive portion 310E and the third protrusive portion 310G respectively through the second bending portion 310D and the third bending portion 310F. In addition, the second protrusive portion 310E and/or the third protrusive portion 310G may have a radiating member. In some embodiments, the substrate 310 may have only the second bending portion 310D and the second protrusive portion 310E but not the third bending portion 310F and the third protrusive portion 310G, or alternatively may have only the third bending portion 310F and the third protrusive portion 310G but not the second bending portion 310D and the second protrusive portion 310E. In another embodiment, each of the four sides of the planar portion 310A has a protrusive portion, and each protrusive portion may have reflective plates and/or a radiating member.

Figure 3C:
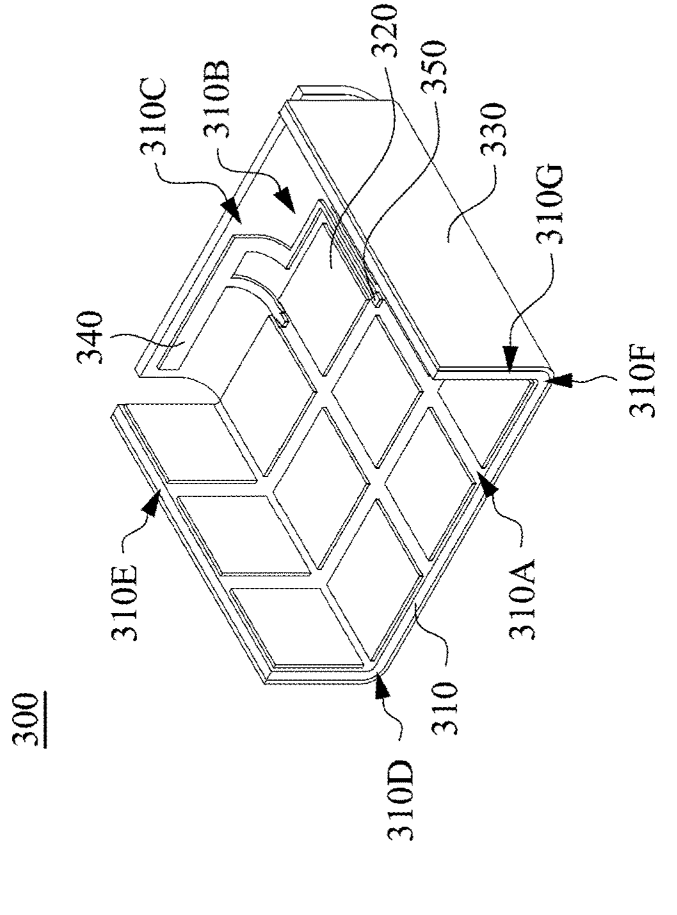
FIGS. 3C and 3D are exemplary stereoscopic diagrams in different viewing angles after the antenna structure in FIGS. 3A and 3B is bent.
Figure 3D:
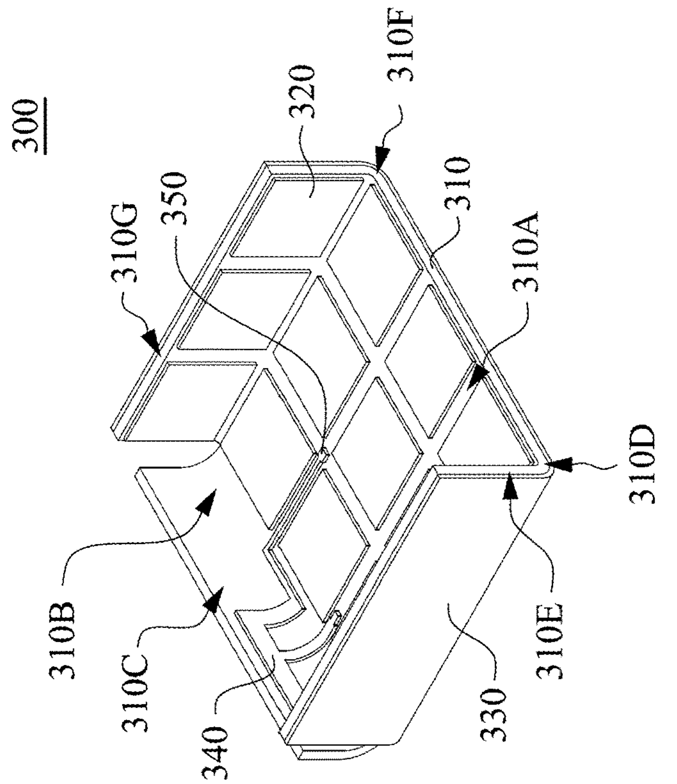

FIGS. 3C and 3D are exemplary diagrams in different viewing angles after the antenna structure 300 is bent. Similar to the antenna array structure 100 in FIG. 1A, after performing a bending treatment on the substrate 310, the angle between the planar portion 310A and the first protrusive portion 310C, the second protrusive portion 310E and/or the third protrusive portion 310G may be about 90-135 degrees.

The planar portion 310A, the first bending portion 310B and the first protrusive portion 310C of the substrate 310, the reflective plates 320, the grounding plate 330, the radiating member 340, the signal feeding via 350, the first conductive vias 360 and the second conductive via 370 respectively correspond to the planar portion 210A, the bending portion 210B and the protrusive portion 210C of the substrate 210, the reflective plates 220, the grounding plate 230, the radiating member 240, the signal feeding via 250, the first conductive vias 260 and the second conductive via 270 shown in FIGS. 2A and 2B, and thus the description thereof can be referred to the above description of the antenna structure 200.

Figure 4:
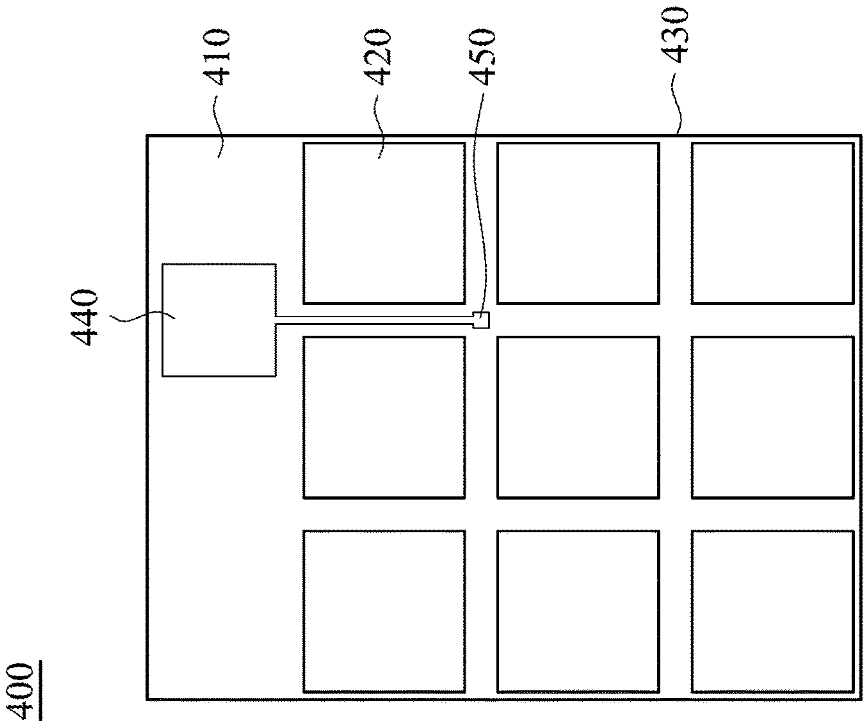
FIG. 4 is a planar view of a first surface of an antenna structure according to another embodiment of the disclosure.

FIG. 4 is a planar view of a first surface of an antenna structure 400 according to another embodiment of the disclosure. As shown in FIG. 4, the antenna structure 400 includes a substrate 410, reflective plates 420, a grounding plate 430, a radiating member 440 and a signal feeding via 450. The reflective plates 420 and the radiating member 440 are disposed on the first surface of the substrate 410, and the grounding plate 430 is disposed on the second surface of the substrate 410. The signal feeding via 450 is coupled to the grounding plate 430 and penetrates through the substrate 410 to be exposed in an opening (not shown in FIG. 4) defined by the grounding plate 430. The difference between the antenna structure 400 in FIG. 4 and the antenna structure 200 in FIGS. 2A and 2B is that the radiating member 440 has a radiating branch and a signal feeding branch but not a grounding branch. As shown in FIG. 4, the radiating branch and the signal feeding member of the radiating member 440 are respectively a rectangular plate and a straight patch. Similar to FIG. 2A, after performing a bending treatment on the substrate 410, the radiating branch is in the protrusive portion of the substrate 410, and the signal feeding branch extends from the planar portion of the substrate 410 to the protrusive portion through the bending portion. The substrate 410, the reflective plates 420, the grounding plate 430 and the signal feeding via 450 are respectively similar to the substrate 210, the reflective plates 220, the grounding plate 230 and the signal feeding via 250 of the antenna structure 200. The description thereof may be referred to the above description of the antenna structure 200.

Figure 5:
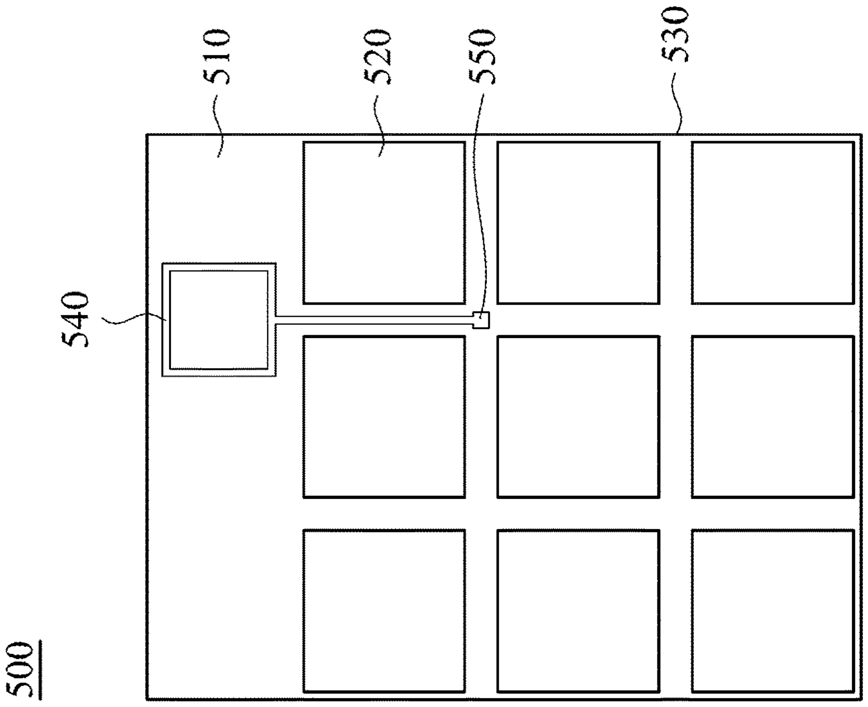
FIG. 5 is a planar view of a first surface of an antenna structure according to another embodiment of the disclosure.

FIG. 5 is a planar view of a first surface of an antenna structure 500 according to one embodiment of the disclosure. As shown in FIG. 5, the antenna structure 500 includes a substrate 510, reflective plates 520, a grounding plate 530, a radiating member 540 and a signal feeding via 550. The reflective plates 520 and the radiating member 540 are disposed on the first surface of the substrate 510, and the grounding plate 530 is disposed on the second surface of the substrate 510. The signal feeding via 550 is coupled to the grounding plate 530 and penetrates through the substrate 510 to be exposed in an opening (not shown in FIG. 5) defined by the grounding plate 530. The difference between the antenna structure 500 in FIG. 5 and the antenna structure 200 in FIGS. 2A and 2B is that the radiating member 540 includes a radiating branch and a signal feeding branch but not a grounding branch. As shown in FIG. 5, the radiating branch and the signal feeding branch of the radiating member 540 are respectively a rectangular frame and a straight strip. Similar to FIG. 2A, after performing a bending treatment on the substrate 510, the radiating branch is in the protrusive portion of the substrate 510, and the signal feeding branch extends from the planar portion of the substrate 510 to the protrusive portion through the bending portion. The substrate 510, the reflective plates 520, the grounding plate 530 and the signal feeding via 550 are respectively similar to the substrate 210, the reflective plates 220, the grounding plate 230 and the signal feeding via 250 of the antenna structure 200, and thus the description thereof may be referred to the above description of the antenna structure 200.

Figure 6B:
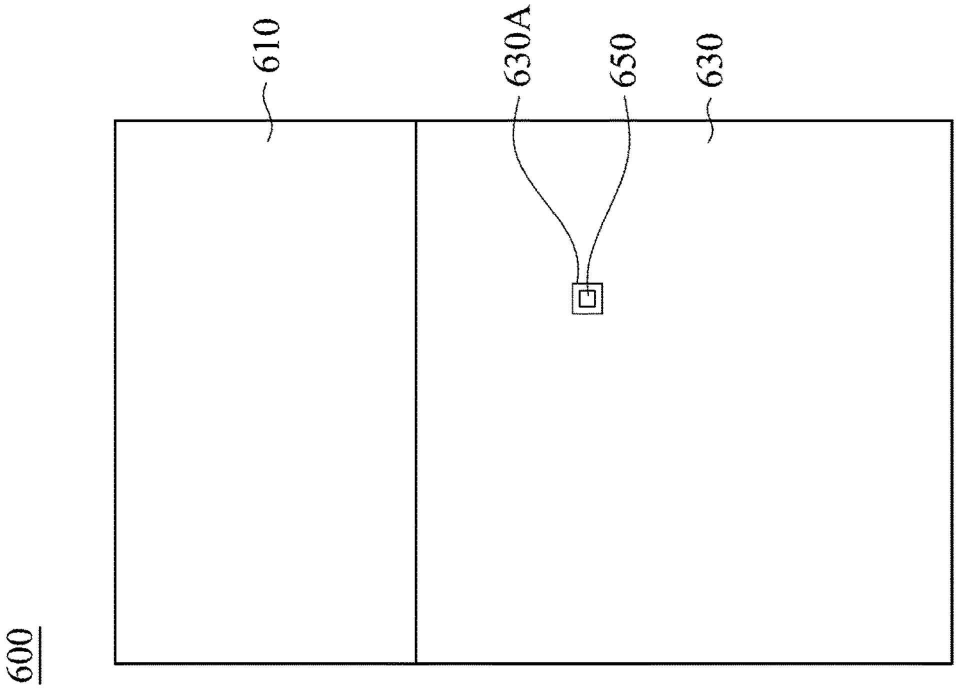
FIGS. 6A and 6B are planar views respectively from the first and second surfaces of an antenna structure according to one embodiment of the disclosure.
Figure 6A:
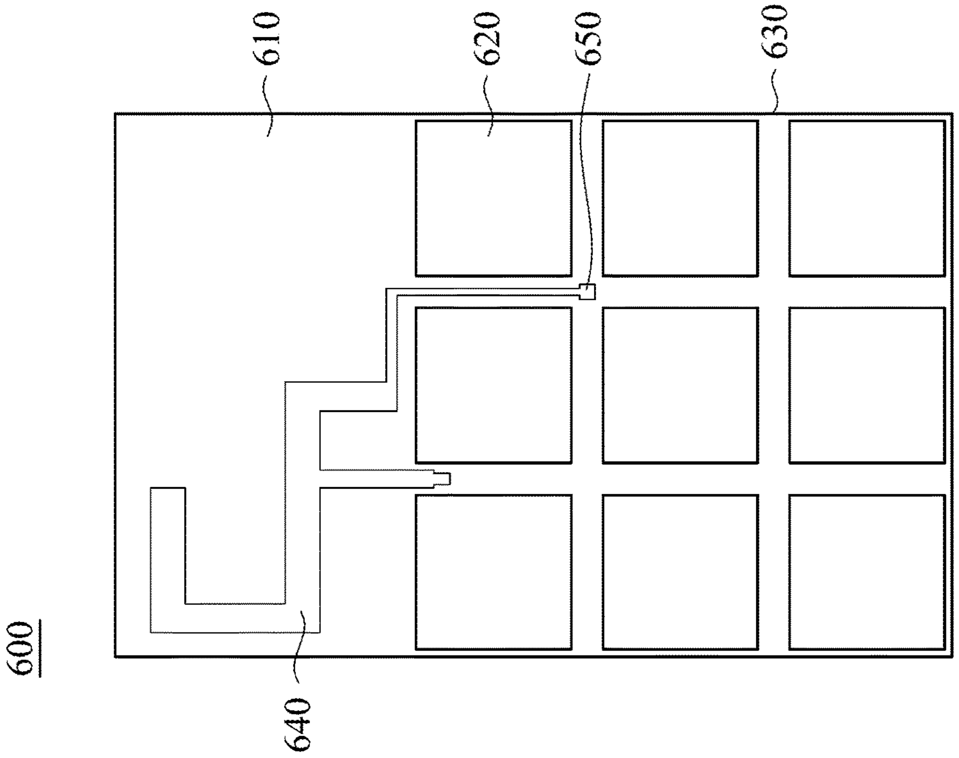

FIGS. 6A and 6B are planar views respectively from a first surface and a second surface of an antenna structure 600 according to one embodiment of the disclosure. As shown in FIGS. 6A and 6B, the antenna structure 600 includes a substrate 610, reflective plates 620, a grounding plate 630, a radiating member 640 and a signal feeding via 650. The reflective plates 620 and the radiating member 640 are disposed on the first surface of the substrate 610, and the grounding plate 630 is disposed on the second surface of the substrate 610. The signal feeding via 650 is coupled to the grounding plate 630 and penetrates through the substrate 610 to be exposed in an opening 630A defined by the grounding plate 630. The difference between the antenna structure 600 of FIGS. 6A and 6B and the antenna structure 200 of FIGS. 2A and 2B is, a radiating branch of the radiating member 640 is a U-shaped frame, and the width of the protrusive portion of the substrate 610 increases accordingly. A planar portion and a bending portion of the substrate 610 and a signal feeding branch and a grounding branch of the radiating member 640 respectively correspond to the planar portion 210A and the bending portion 210B of the substrate 210 and the signal feeding branch and the grounding branch of the radiating member 240 shown in FIG. 2A, and the reflective plates 620, the grounding plate 630 and the signal feeding via 650 are respectively similar to the reflective plates 220, the grounding plate 230 and the signal feeding via 250 of the antenna structure 200, and thus the description thereof may be referred to the above description of the antenna structure 200.

Figure 7B:
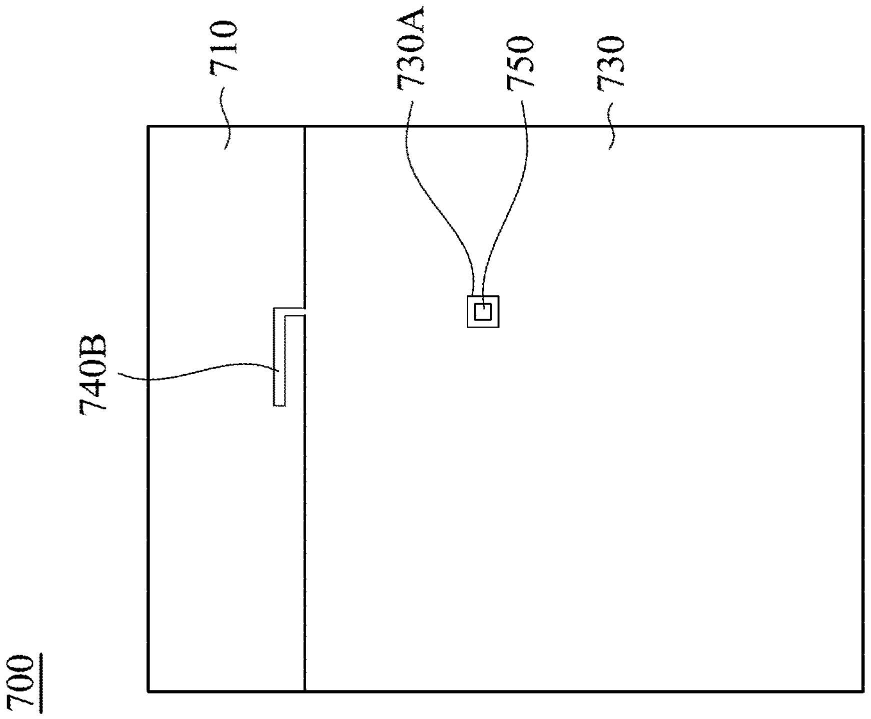
FIGS. 7A and 7B are planar views respectively from the first and second surfaces of an antenna structure according to one embodiment of the disclosure.
Figure 7A:
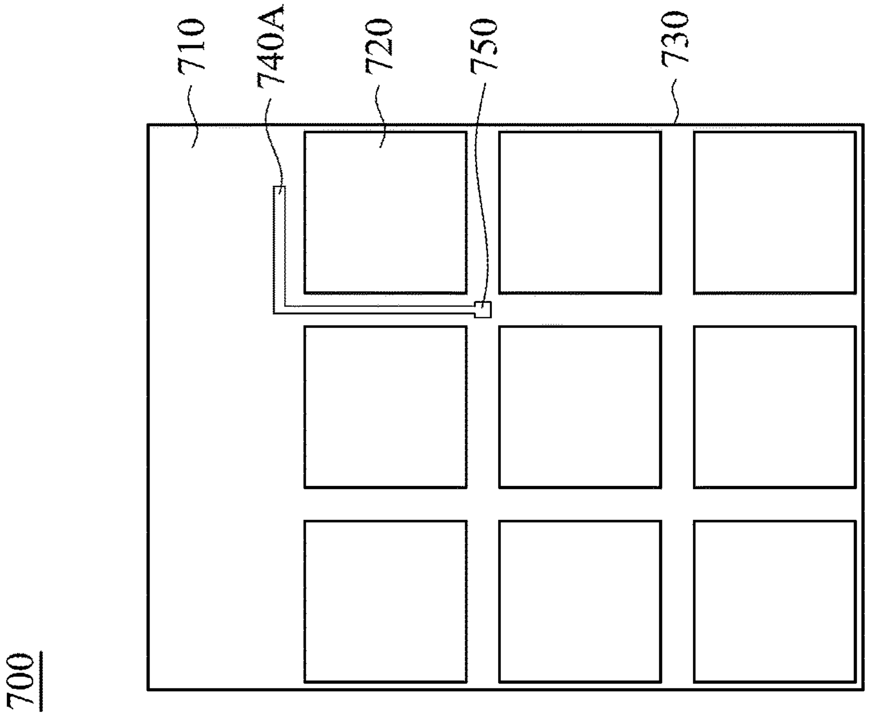

FIGS. 7A and 7B are planar views respectively from a first surface and a second surface of an antenna structure 700 according to one embodiment of the disclosure. As shown in FIGS. 7A and 7B, the antenna structure 700 includes a substrate 710, reflective plates 720, a grounding plate 730, radiating members 740A, 740B and a signal feeding via 750. The reflective plates 720 and the radiating member 740A are disposed on the first surface of the substrate 710, and the grounding plate 730 and the radiating member 740B are disposed on the second surface of the substrate 710. The signal feeding via 750 is coupled to the grounding plate 730 and penetrates through the substrate 710 to be exposed in an opening 730A defined by the grounding plate 730. The difference between the antenna structure 700 of FIGS. 7A and 7B and the antenna structure 200 of FIGS. 2A and 2B is that the radiating members 740A and 740B constitute a dipole antenna, wherein the radiating member 740A is coupled to an external terminal through the signal feeding via 750, while the radiating member 740B is coupled to the grounding plate 730. The substrate 710, the reflective plates 720, the grounding plate 730 and the signal feeding via 750 are respectively similar to the substrate 210, the reflective plates 220, the grounding plate 230 and the signal feeding via 250 of the antenna structure 200, and thus the description thereof may be referred to the above description of the antenna structure 200.

Figure 8B:
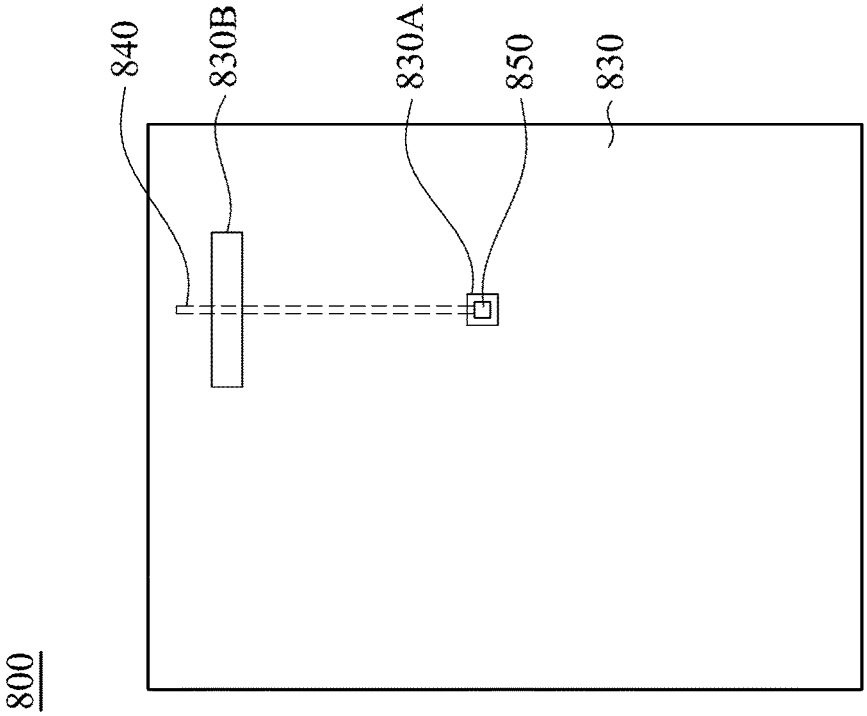
FIGS. 8A and 8B are planar views respectively from the first and second surfaces of an antenna structure according to one embodiment of the disclosure.
Figure 8A:
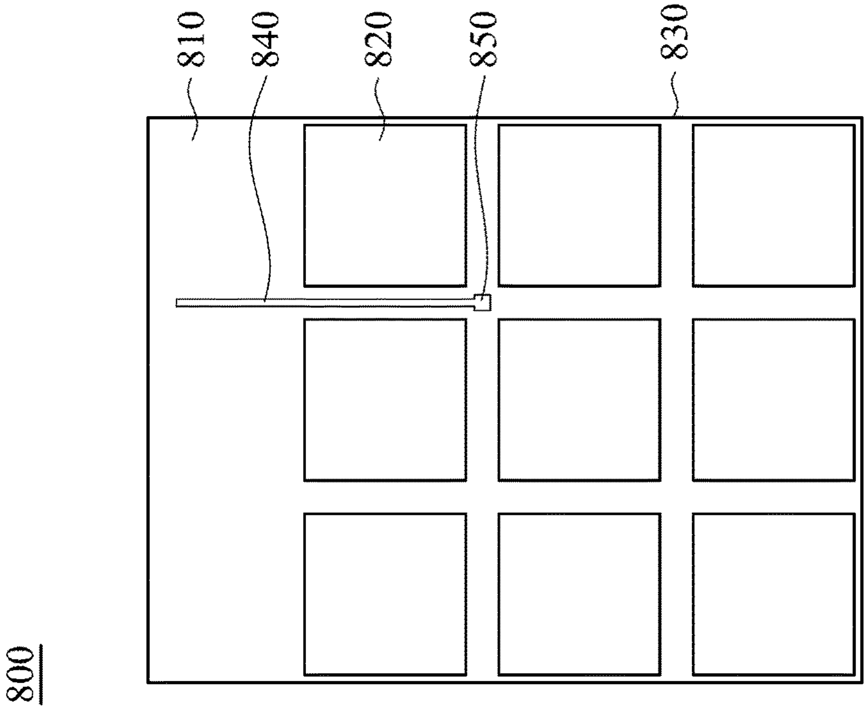

FIGS. 8A and 8B are planar views respectively from a first surface and a second surface of an antenna structure 800 according to one embodiment of the disclosure. As shown in FIGS. 8A and 8B, the antenna structure 800 includes a substrate 810, reflective plates 820, a grounding plate 830, a radiating member 840 and a signal feeding via 850. The reflective plates 820 and the radiating member 840 are disposed on the first surface of the substrate 810, and the grounding plate 830 is disposed on the second surface of the substrate 810. The signal feeding via 850 is coupled to the grounding plate 830 and penetrates through the substrate 810 to be exposed in an opening 830A defined by the grounding plate 830. The difference between the antenna structure 800 of FIGS. 8A and 8B and the antenna structure 200 of FIGS. 2A and 2B, the radiating member 840 includes a radiating branch and a signal feeding branch but not a grounding branch, and the radiating branch and the signal feeding branch constitute a straight strip. In addition, the grounding plate 830 extends from a planar portion to a protrusive portion through a bending portion and further defines a slot 830B. The slot 830B may be in the bending portion and/or the protrusive portion of the substrate 810 and is overlapped with the radiating member 840 in the normal direction of the substrate 810. The substrate 810, the reflective plates 820 and the signal feeding via 850 are respectively similar to the substrate 210, the reflective plates 220 and the signal feeding via 250 of the antenna structure 200, and thus the description thereof may be referred to the above description of the antenna structure 200.

Figure 9:
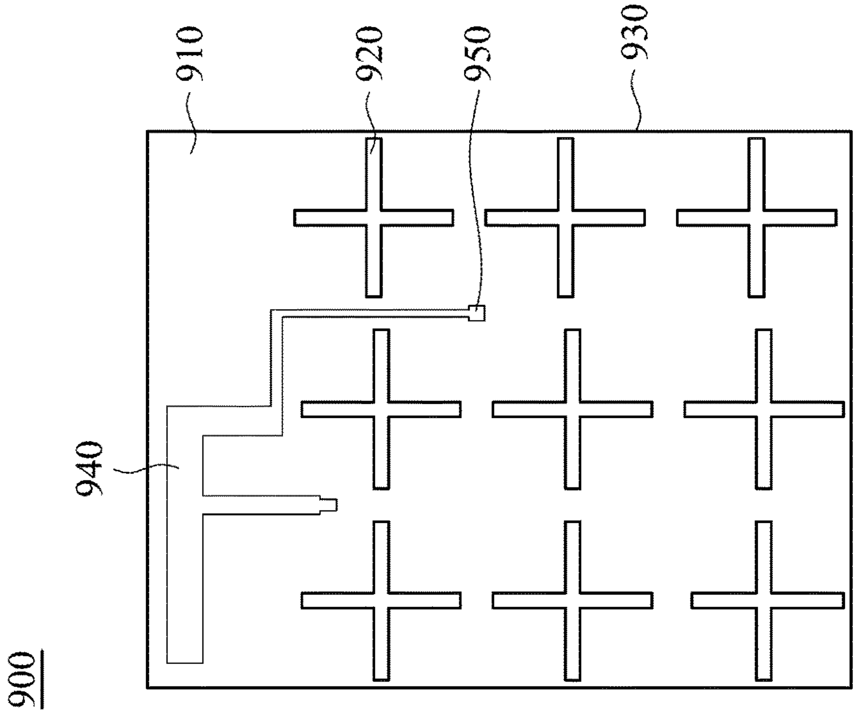
FIG. 9 is a planar view of a first surface of an antenna structure according to one embodiment of the disclosure.

FIG. 9 is a planar view from a first surface of an antenna structure 900 according to one embodiment of the disclosure. As shown in FIG. 9, the antenna structure 900 includes a substrate 910, reflective plates 920, a grounding plate 930, a radiating member 940 and a signal feeding via 950. The reflective plates 920 and the radiating member 940 are disposed on the first surface of the substrate 910, and the grounding plate 930 is disposed on the second surface of the substrate 910. The signal feeding via 950 is coupled to the grounding plate 930 and penetrates through the substrate 910 to be exposed in an opening (now shown in FIG. 9) defined by the grounding plate 930. The difference between the antenna structure 900 in FIG. 9 and the antenna structure 200 in FIGS. 2A and 2B is, as shown in FIG. 9, each reflective plate 920 has a cross shape. The substrate 910, the grounding plate 930, the radiating member 940 and the signal feeding via 950 are respectively similar to the substrate 210, the grounding plate 230, the radiating member 240 and the signal feeding via 250 of the antenna structure 200, and thus the description thereof may be referred to the above description of the antenna structure 200.

Figure 10:
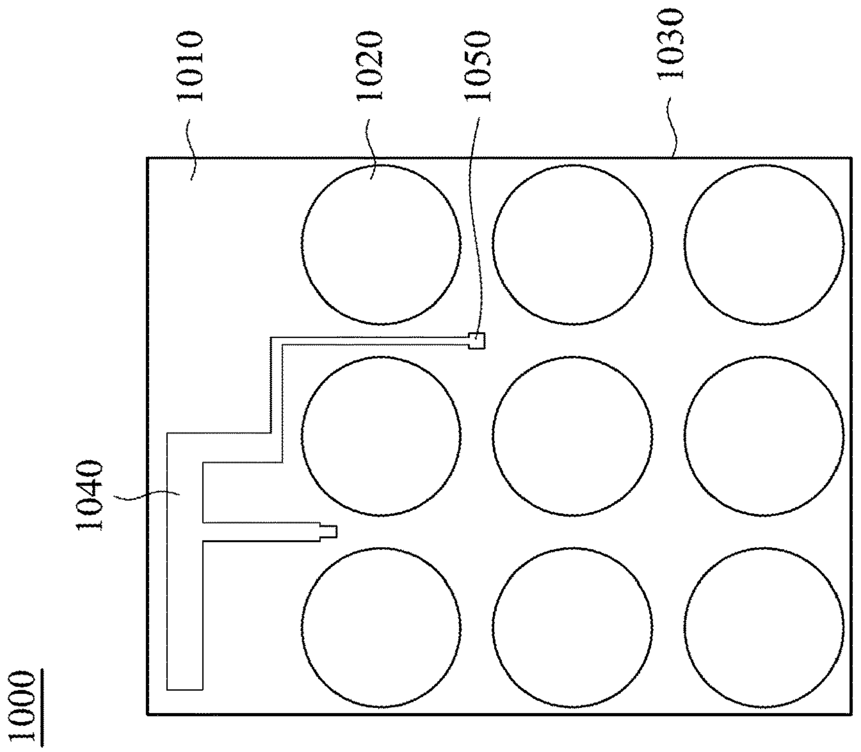
FIG. 10 is a planar view of a first surface of an antenna structure according to another embodiment of the disclosure.

FIG. 10 is a planar view from a first surface of an antenna structure 1000 according to one embodiment of the disclosure. The antenna structure 1000 shown in FIG. 10 includes a substrate 1010, reflective plates 1020, a grounding plate 1030, a radiating member 1040 and a signal feeding via 1050. The reflective plates 1020 and the radiating member 1040 are disposed on the first surface of the substrate 1010, and the grounding plate 1030 is disposed on the second surface of the substrate 1010. The signal feeding via 1050 is coupled to the grounding plate 1030 and penetrates through the substrate 1010 to be exposed in an opening (not shown in FIG. 10) defined by the grounding plate 1030. The difference between the antenna structure 1000 in FIG. 10 and the antenna structure 200 in FIGS. 2A and 2B is that, as shown in FIG. 10, each reflective plate 1020 is a circular plate. The substrate 1010, the grounding plate 1030, the radiating member 1040 and the signal feeding via 1050 are respectively similar to the substrate 210, the grounding plate 230, the radiating member 240 and the signal feeding via 250 of the antenna structure 200, and thus the description thereof may be referred to the above description of the antenna structure 200.

Figure 11:
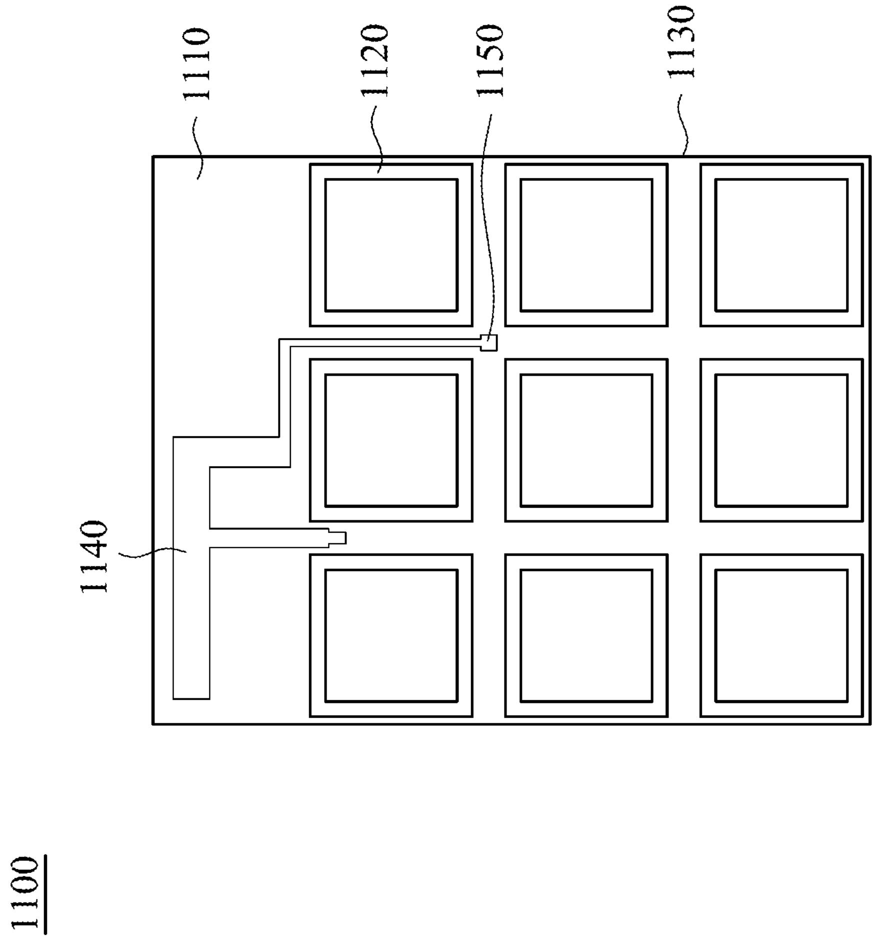
FIG. 11 is a planar view of a first surface of an antenna structure according to another embodiment of the disclosure.

FIG. 11 is a planar view from a first surface of an antenna structure 1100 according to one embodiment of the disclosure. The antenna structure 1100 shown in FIG. 11 includes a substrate 1110, reflective plates 1120, a grounding plate 1130, a radiating member 1140 and a signal feeding via 1150. The reflective plates 1120 and the radiating member 1140 are disposed on the first surface of the substrate 1110, and the grounding plate 1130 is disposed on the second surface of the substrate 1110. The signal feeding via 1150 is coupled to the grounding plate 1130 and penetrates through the substrate 1110 to be exposed in an opening (not shown in FIG. 11) defined by the grounding plate 1130. The difference between the antenna structure 1100 in FIG. 11 and the antenna structure 200 in FIGS. 2A and 2B is that, as shown in FIG. 11, each reflective plate 1120 is a rectangular frame. The substrate 1110, the grounding plate 1130, the radiating member 1140 and the signal feeding via 1150 are respectively similar to the substrate 210, the grounding plate 230, the radiating member 240 and the signal feeding via 250 of the antenna structure 200, and thus the description thereof may be referred to the above description of the antenna structure 200.

Figure 12:
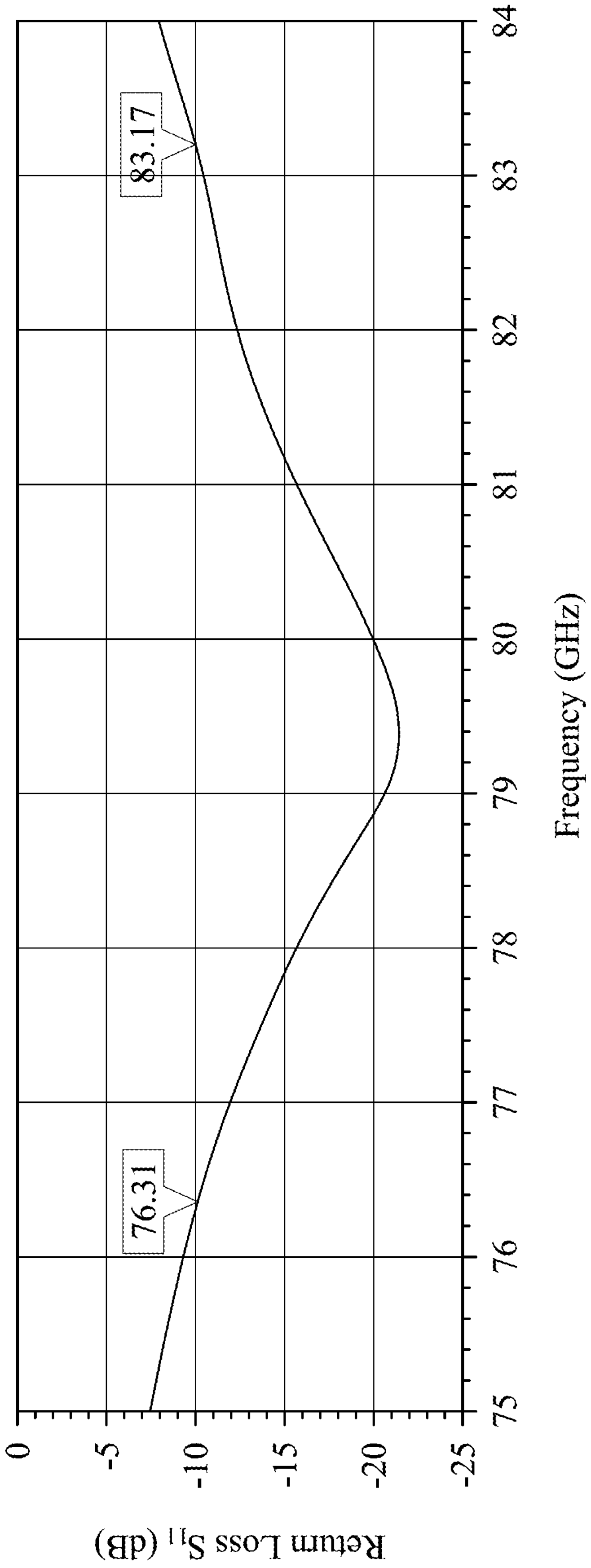
FIG. 12 is a return loss simulation result of the antenna array structure in the embodiment of the disclosure.

FIG. 12 is a return loss $S_{11}$ simulation result of the antenna array structure 100 in the embodiment of the disclosure, wherein each of the antenna units 100A-100H has the antenna structure 200 shown in FIGS. 2A-2D. In this embodiment, the width $W_{210B}$ of the bending portion 210B is 0.5-2.5 mm, the length $L_{220}$ of each reflective plate 220 is 1.5-3.5 mm, the lengths $L1_{240}$, $L2_{240}$, $L3_{240}$, $L4_{240}$, $L5_{240}$ of the sections of the radiating member 240 are respectively 2-3.5 mm, 0.5-1.5 mm, 0.3-1.5 mm, 1.8-3.8 mm and 0.5-1.5 mm, and the widths $W1_{240}$, $W2_{240}$, $W3_{240}$, $W4_{240}$, $W5_{240}$ of the sections of the radiating member 240 are all 0.05-3.5 mm, the width $W_{230A}$ of the opening 230A is 0.2-0.6 mm, and the planar length $L_{250}$ of the signal feeding via 250 is 0.05-0.25 mm. As shown in FIG. 12, the operating band of the antenna array structure 100 (the frequency band in which the return loss $S_{11}$ less than −10 dB) is 76.31-83.17 GHz, and it can be seen that the embodiment of the disclosure has the effect of bandwidth increasing.

Figure 13:
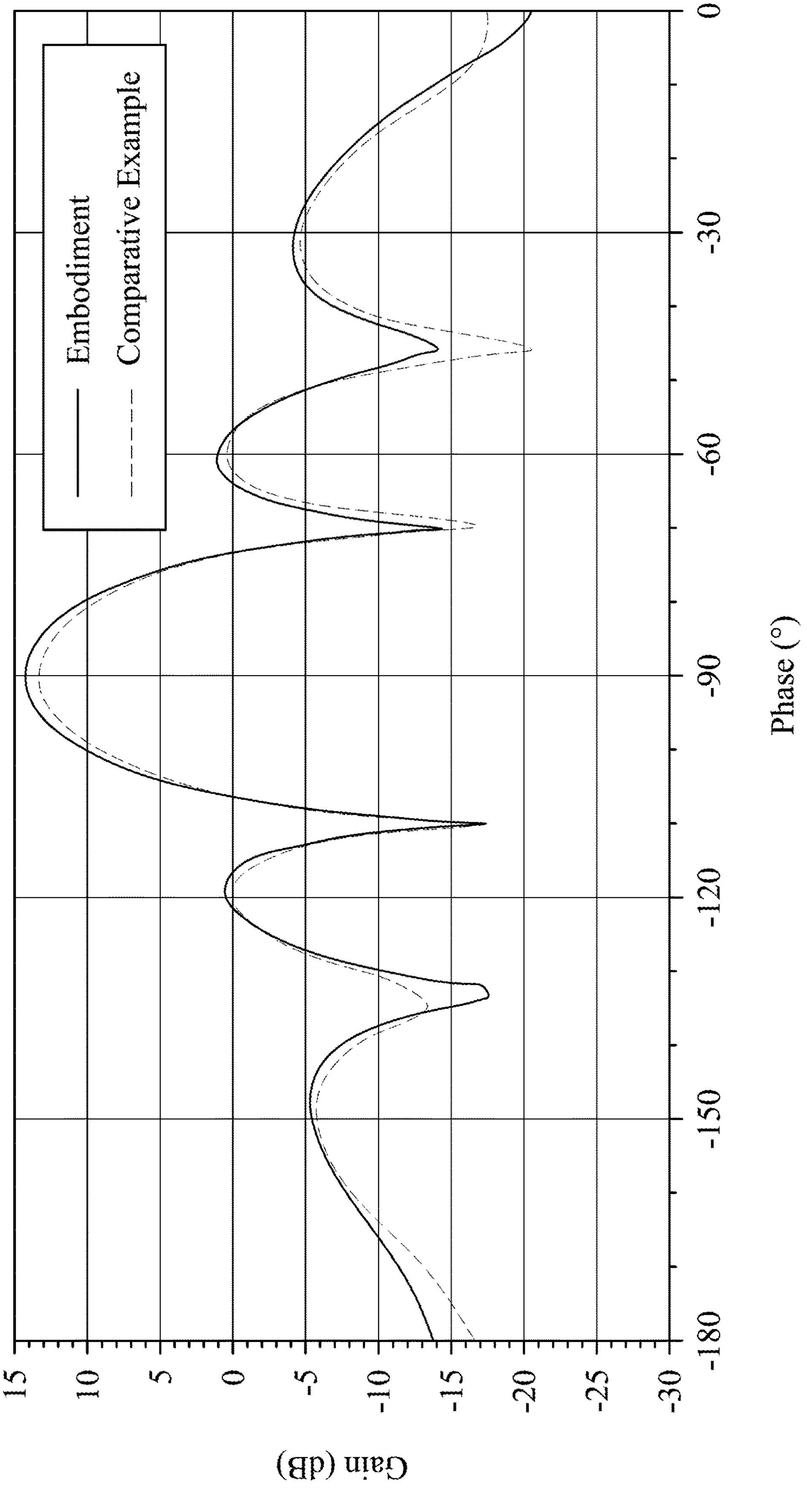
FIG. 13 is an antenna gain simulation result of the embodiment of the disclosure versus a comparative example.

FIG. 13 is an antenna gain simulation result of the antenna array structure 100 in the embodiment of the disclosure versus a comparative example, in which the comparative example is an antenna array structure without any reflective plate array. As shown in FIG. 13, in comparison with the antenna array structure of the comparative example, the antenna array structure 100 according to the embodiment of the disclosure can further increase the maximum antenna gain and the gain difference between the main lobe and the side lobe, so as to further increase the directivity.

It will be apparent to those skilled in the art that various modifications and variations can be made to the structure of the disclosure without departing from the scope or spirit of the disclosure. In view of the foregoing, it is intended that the disclosure cover modifications and variations of this disclosure provided they fall within the scope of the following claims.

What is claimed is:

1. An antenna structure comprising:

a substrate having opposite first surface and second surface and comprising liquid crystal polymer material;

a plurality of reflective plates disposed on the first surface of the substrate and arranged in an array;

a grounding plate disposed on the second surface of the substrate and overlapped with the reflective plates in a normal direction of the substrate, and the grounding plate includes an opening;

a first radiating member disposed on the first surface of the substrate and physically separated from the reflective plates;

a signal feeding via coupled to the first radiating member and penetrating through the substrate to be exposed in the opening of the grounding plate; and a plurality of first conductive vias respectively coupled to the reflective plates and penetrating through the substrate to couple with the grounding plate;

wherein the substrate has a planar portion, a first bending portion and a first protrusive portion, the reflective plates are in the planar portion, and the first radiating member extending from the planar portion to the first protrusive portion through the first bending portion.

2. The antenna structure of claim 1, wherein a radiating portion of the first radiating member is in the first protrusive portion.

3. The antenna structure of claim 1, wherein an angle between the first protrusive portion and the planar portion is about 90-135 degrees.

4. The antenna structure of claim 1, wherein the signal feeding via is positioned between four of the reflective plates that are arranged in two columns and two rows.

5. The antenna structure of claim 1 further comprising:

a second conductive via coupled to a grounding branch of the first radiating member and penetrating through the substrate to couple with the grounding plate.

6. The antenna structure of claim 1, wherein a radiating branch of the first radiating member is a straight strip, a rectangular plate, a rectangular frame or a U-shaped frame.

7. The antenna structure of claim 1, further comprising:

a second radiating member disposed on the second surface of the substrate and coupled to the grounding plate, wherein the second radiating member and the first radiating member constitute a dipole antenna.

8. The antenna structure of claim 1, wherein each of the reflective plates is a rectangular plate, a rectangular frame, or cross-shaped.

9. The antenna structure of claim 1, wherein the substrate further has a second bending portion and a second protrusive portion, and the grounding plate extends to the second protrusive portion through the second bending portion.

10. An antenna array structure comprising:

a substrate having opposite first surface and second surface and comprising liquid crystal polymer material;

a plurality of reflective plates disposed on the first surface of the substrate and arranged in an array;

a grounding plate disposed on the second surface of the substrate and overlapped with the reflective plates in a normal direction of the substrate, wherein the grounding plate includes a plurality of openings;

a plurality of radiating members on the first surface of the substrate and physically separated from the reflective plates, wherein the radiating members are periodically arranged in a longitudinal direction of the substrate;

a plurality of signal feeding vias respectively coupled to the radiating members and penetrating through the substrate to be exposed respectively in the openings of the grounding plate; and a plurality of conductive vias respectively coupled to the reflective plates and penetrating through the substrate to couple with the grounding plate;

wherein the substrate has a planar portion, a bending portion and a protrusive portion, wherein the reflective plates are in the planar portion, and the radiating members extending from the planar portion to the protrusive portion through the bending portion.

* * * * *